US006061553A

United States Patent [19]

Matsuoka et al.

[11] Patent Number: 6,061,553

[45] Date of Patent: May 9, 2000

[54] ADAPTIVE ANTENNA

[75] Inventors: Hidehiro Matsuoka, Yokohama; Hiroki Shoki, Kawasaki; Akihiro Tsujimura, Isehara; Yasushi Murakami, Yokohama, all of Japan

[73] Assignee: Kabushiki Kaisha Toshiba, Kawasaki, Japan

[21] Appl. No.: 09/002,394

[22] Filed: Jan. 2, 1998

[30] Foreign Application Priority Data

| | | | |
|---|---|---|---|
| Jan. 7, 1997 | [JP] | Japan | 9-000841 |
| Dec. 16, 1997 | [JP] | Japan | 9-346899 |

[51] Int. Cl.[7] .......... H04B 1/06

[52] U.S. Cl. .......... 455/273; 455/278.1; 455/277.2

[58] Field of Search .......... 455/18, 25, 550, 455/132, 137, 272, 273, 277.1, 277.2, 278.1, 296, 334, 562; 342/383, 380, 375, 374

[56] References Cited

U.S. PATENT DOCUMENTS 4,736,460 4/1988 Rilling .

FOREIGN PATENT DOCUMENTS 0 570 166 11/1993 European Pat. Off. .
0 582 233 2/1994 European Pat. Off. .
0 670 608 9/1995 European Pat. Off. .

OTHER PUBLICATIONS

H. Wang, et al., Electronics and Communications in Japan, Part 1–Communications, vol. 76, No. 5, pp. 101–113, "Adaptive Array Antenna Combined with Tapped Delay Line Using Processing Gain for Direct–Sequence/Spread–Spectrum Multiple–Access System", May 1, 1993.

Yasutaka Ogawa, et al., "Spatial–Domain Path–Diversity Using an Adaptive Array for Mobile Communications", Proceeding of 4th IEEE Inernational Conference on Universal Personal Communications, Nov. 1995, pp. 600–604.

*Primary Examiner*—Reinhard J. Eisenzopf
*Assistant Examiner*—Marsha D. Banks-Harold
*Attorney, Agent, or Firm*—Oblon, Spivak, McClelland, Maier & Neustadt, P.C.

[57] ABSTRACT

An adaptive antenna is disclosed, that comprises a plurality of antenna elements $\mathbf{1}_1$, $\mathbf{1}_2$, . . . , and $\mathbf{1}_N$ with different directivity, delay profile measuring units $\mathbf{2}_1$, $\mathbf{2}_2$, . . . , and $\mathbf{2}_N$ for estimating states of received signals of the antenna elements for each of delay times that have been designated, antenna selecting units $\mathbf{3}_1$, $\mathbf{3}_2$, . . . , and $\mathbf{3}_L$ for selecting a part of the antenna elements for each of the delay times corresponding to the estimated result, adaptive signal processing portions $\mathbf{4}_1$, $\mathbf{4}_2$, . . . , and $\mathbf{4}_L$ for determining the received signals of the part of the antenna elements that have been selected and multiplying the received signals to which relevant weights have been determined for each of the delay time and summing the weighted signals, delaying circuits $\mathbf{5}_2$ and $\mathbf{5}_3$ for compensating the time lag, or delay of each of the received signals for each of the delay times, and a combining unit 6 for combining the weighted signals that have been compensated for the delay times.

8 Claims, 10 Drawing Sheets

ADAPTIVE ANTENNA

BACKGROUND OF THE INVENTION

1. Field of the Invention

The present invention relates to an adaptive antenna for a base station and a terminal unit used in for example a radio communication system.

2. Description of the Related Art

An adaptive antenna suppresses undesired signal such as delayed signals and interference signals that a base station or a terminal unit has received so as to increase the data transmission rate and the number of users. In the adaptive antenna, energy of delayed signals through multipath is combined as desired signals and thereby the signal-to-noise ratio of the desired signal is improved.

As shown in FIG. 9, signals received by a plurality of omni-directional antenna elements 101, 102, and 103 are sent to A/D converters 104, 105, and 106. The A/D converters 104, 105, and 106 convert the received signals into digital signals and distribute the digital signals to a plurality of adaptive signal processing portions 107, 108, and 109. In the adaptive signal processing portions 107, 108, and 109, the output signals of the A/D converters 104, 105, and 106 are sent to respective weighting units 110. The output signals of the weighting units 110 are sent to respective adding units 111. The adding units 111 combine the output signals of the weighting units 110.

A weighting amount of each weighting unit 110 is designated by a weight control circuit 113. The weight control circuit 113 designate weighting amounts of the weighting units 110 so as to emphasize a signal component that has a strong correlation with a reference signal and suppress the other signal components as interference components.

In addition, the weight control circuit 113 controls the weighting amounts that the adaptive signal processing portions 107, 108, and 109 designate in such a manner that a particular adaptive signal processing portion extracts a first incoming signal component (that does not have a delay) and other adaptive signal processing portions extract signal components that have delays.

Thus, a combining unit 112 extracts a pure signal of which delayed signals and interference signals are removed from a received signal that consist of a first incoming signal and delayed signals.

However, assuming that the number of delayed signals that the adaptive antenna receives is L and the number of antenna elements thereof is N, the adaptive antenna requires (L×N) weighting units. The number of weighting units affects the number of calculations of the weighting amounts of the controlling circuit. Thus, the circuit structure becomes complicated.

SUMMARY OF THE INVENTION

The present invention is made from the above-described point of view. An object of the present invention is to provide an adaptive antenna that allows the number of weighting units to be remarkably decreased and thereby the structure thereof to be simplified.

Another object of the present invention is to provide an adaptive antenna that allows the weighting process to be quickly performed, thereby quickly adapting to the fluctuation of the transmission environment of the radio signal.

A further object of the present invention is to provide an adaptive antenna that can remarkably suppress an interference signal from taking place.

The present invention is an adaptive antenna that comprises a plurality of antenna elements with different directivity, an estimating means for estimating states of received signals of the antenna elements for each of delay times that have been designated, a selecting means for selecting a part of the antenna elements for each of the delay times corresponding to the estimated result, a weighting means for determining the received signals of the part of said antenna elements selected by said selecting means by relevant weights, first combining means for multiplying the received signals to which relevant weights have been determined for each of the delay time and summing the weighted signals, compensating means for compensating the time lag, or time delay of each of the received signals for each of the delay times, and second combining means for combining the compensated signals for the delay times.

According to an adaptive antenna of the present invention, a part of antenna elements is selected for each delay times corresponding to the estimated result of a received signal of each antenna element. The received signals of each selected antenna element is weighted. Thus, a pure signal of which a interference signal component is removed from a received signal in each of delay times is obtained. In addition, the total process amount for designating weights to received signals can be remarkably reduced in comparison with that of the related art reference.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, with reference to the accompanying drawings, an embodiment of the present invention will be described.

Figure 1:
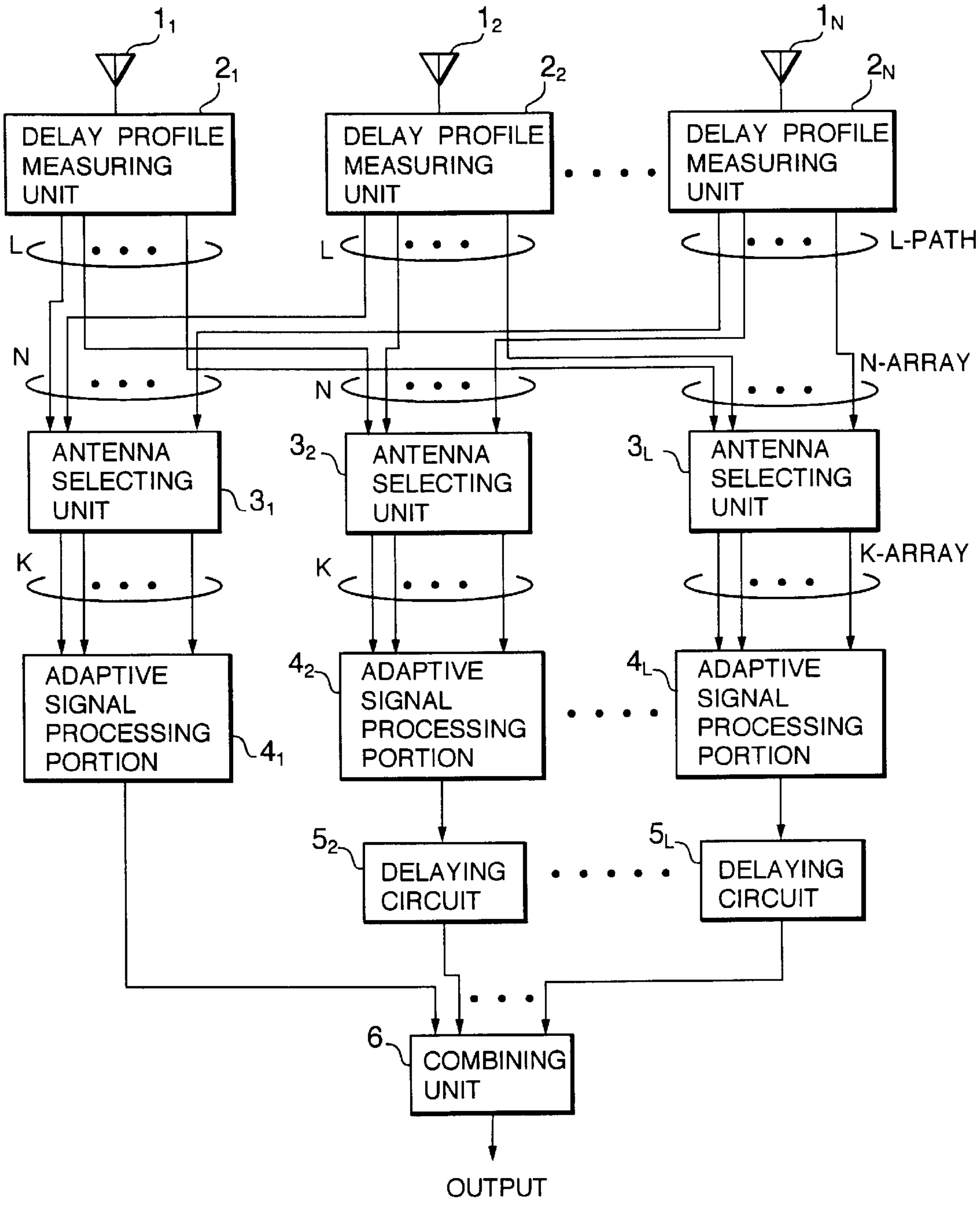
FIG. 1 is a schematic diagram showing the structure of an adaptive antenna according to a first embodiment of the present invention.

FIG. 1 is a schematic diagram showing the structure of an adaptive antenna according to a first embodiment of the present invention.

N antenna elements $\mathbf{1}_1$, $\mathbf{1}_2$, . . . , and $\mathbf{1}_N$ that have respective directivity have respective beam directions. Alternatively, the adaptive antenna according to the present invention can be accomplished with omni-directional antenna elements.

The antenna elements $\mathbf{1}_1$, $\mathbf{1}_2$, . . . , and $\mathbf{1}_N$ are connected to delay profile measuring units $\mathbf{2}_1$, $\mathbf{2}_2$, . . . , and $\mathbf{2}_N$, respectively. The delay profile measuring units $\mathbf{2}_1$, $\mathbf{2}_2$, . . . , and $\mathbf{2}_N$ generate delay profiles of the antenna elements $\mathbf{1}_1$, $\mathbf{1}_2$, . . . , and $\mathbf{1}_N$ with a correlating process using a known reference symbol placed in a transmission signal.

The delay profile measuring units $\mathbf{2}_1$, $\mathbf{2}_2$, . . . , and $\mathbf{2}_N$ extract signal components for L different delay times from the received signals and supply the extracted signal components for the L different delay times to antenna selecting units $\mathbf{3}_1$, $\mathbf{3}_2$, . . . , and $\mathbf{3}_L$ corresponding to the delay times. The antenna selecting units $\mathbf{3}_1$, $\mathbf{3}_2$, . . . , and $\mathbf{3}_L$ select received signals of K (where K<N) antenna elements from the received signals of the N antenna elements $\mathbf{1}_1$, $\mathbf{1}_2$, . . . , $\mathbf{1}_N$ and supply the selected signals to adaptive signal processing portions $\mathbf{4}_1$, $\mathbf{4}_2$, . . . , and $\mathbf{4}_L$.

The adaptive signal processing portion $\mathbf{4}_1$, process a signal component with no delay time (namely, a first incoming signal). The other adaptive signal processing portions $\mathbf{4}_2$, . . . , and $\mathbf{4}_L$ process signal components with respective delay times (delayed signals). The signals processed by the adaptive signal processing portions $\mathbf{4}_1$, $\mathbf{4}_2$, . . . , and $\mathbf{4}_N$ are combined by a combining unit 6.

Next, with reference to FIG. 2, the operation of the adaptive antenna according to the first embodiment will be described.

It is assumed that the adaptive antenna is composed of eight (N=8) antenna elements $\mathbf{1}_1$ to $\mathbf{1}_8$. The antenna elements $\mathbf{1}_1$ to $\mathbf{1}_8$ are disposed at positions on a circle. The antenna elements $\mathbf{1}_1$ to $\mathbf{1}_8$ are sector beam antennas that radiate with the maximum amount from the center thereof. Thus, the antenna elements $\mathbf{1}_1$ to $\mathbf{1}_8$ with such directivity suppresses interference signal incoming from first directions other than DOA of a desired signal, thereby preventing the first incoming signal from degrading.

Figure 2:
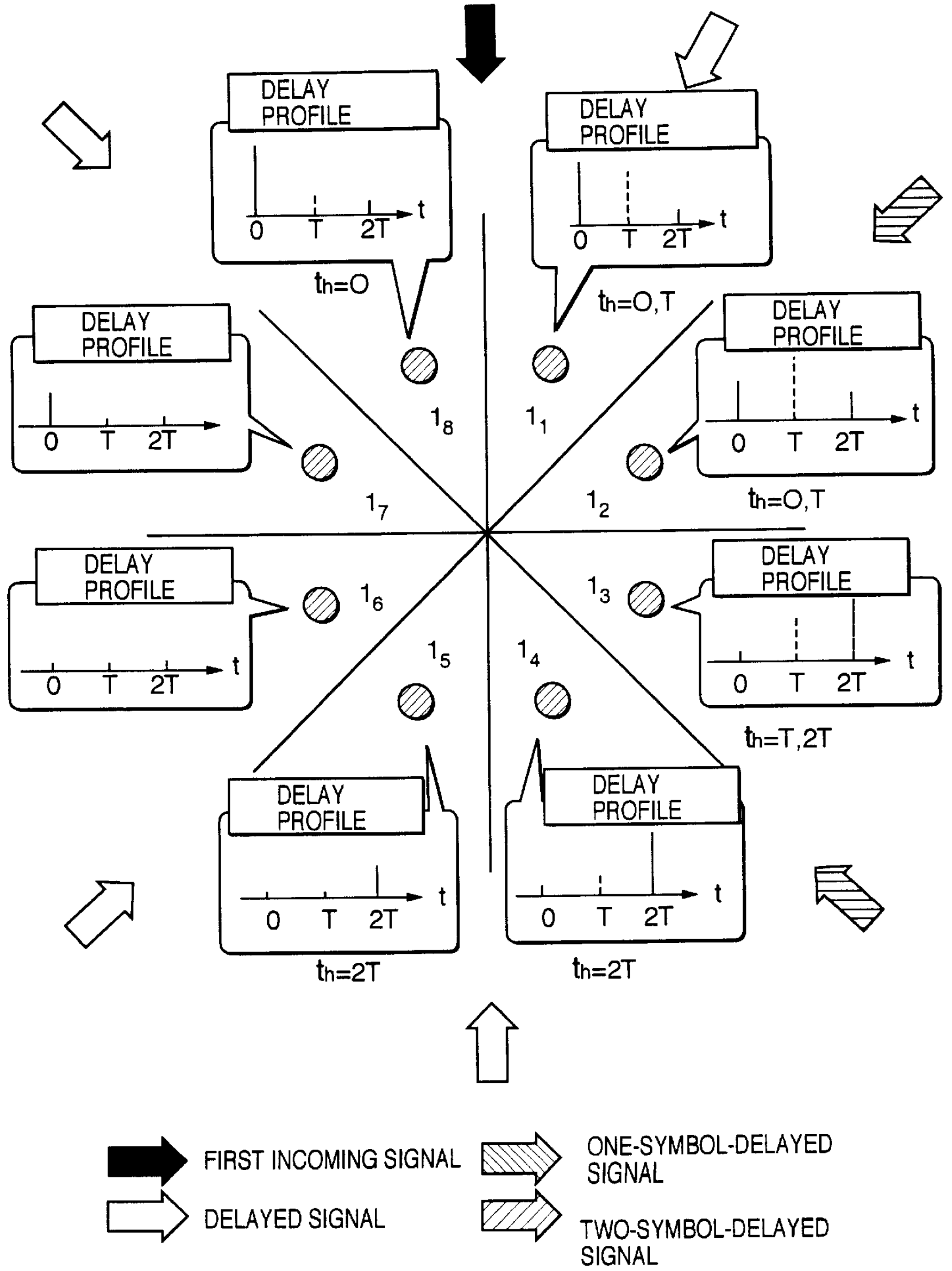
FIG. 2 is a schematic diagram showing the relation between signals that antenna elements receive and delay profiles thereof according to the adaptive antenna according to the first embodiment.

FIG. 2 is a schematic diagram showing the relation between signals that antenna elements $\mathbf{1}_1$ to $\mathbf{1}_8$ receive and delay profiles thereof estimated by delay profile measuring units $\mathbf{2}_1$, $\mathbf{2}_2$, . . . , and $\mathbf{2}_N$. In each delay profile, the horizontal axis represents delay time, whereas the vertical axis represents the power of the received signal. It is assumed that signals to be measured are a first incoming signal, a one-symbol-delayed signal, and a two-symbol-delayed signal.

Each of the antenna selecting units $\mathbf{3}_1$, $\mathbf{3}_2$, . . . , $\mathbf{3}_L$. (where L-=3) selects K (=3) received signals with larger powers for each of delay times (first incoming signal, one-symbol-delayed signal, and two-symbol-delayed signal). The K received signals for each of delay times are sent to the adaptive signal processing portions $\mathbf{4}_1$, $\mathbf{4}_2$, . . . , and $\mathbf{4}_L$ corresponding to the respective delay times.

In other words, the antenna selecting unit $\mathbf{3}_1$ selects the antenna elements $\mathbf{1}_1$, $\mathbf{1}_2$, and $\mathbf{1}_8$ with larger signal intensity of the received first incoming signal. The antenna selecting unit $\mathbf{3}_2$ selects the antenna elements $\mathbf{1}_1$, $\mathbf{1}_2$, and $\mathbf{1}_3$ with larger signal intensity of the one-symbol-delayed signal. The antenna selecting unit $\mathbf{3}_L$ selects the antenna elements $\mathbf{1}_3$, $\mathbf{1}_4$, and $\mathbf{1}_5$ with larger signal intensity of the two-symbol-delayed signal.

Figure 3:
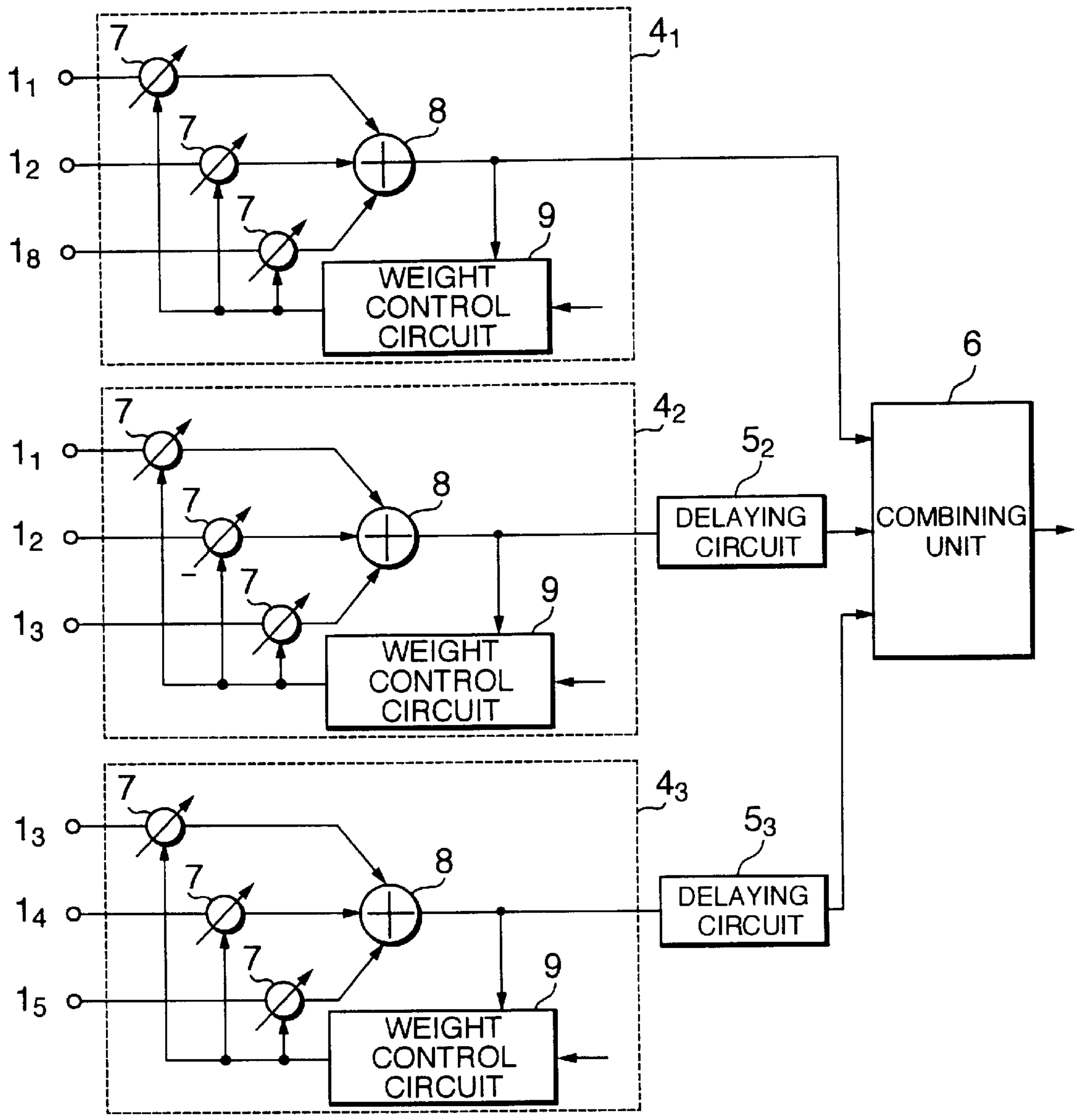
FIG. 3 is a schematic diagram showing the structure of an adaptive signal processing portion of the adaptive antenna according to the first embodiment.

FIG. 3 is a schematic diagram showing the structure of an adaptive signal processing portion. Referring to FIG. 3, each of the adaptive signal processing portions $\mathbf{4}_1$, $\mathbf{4}_2$, . . . , and $\mathbf{4}_L$ comprises K weighting units 7, an adding unit 8, and a weight control circuit 9.

The weighting units 7 designate weights to received signals of the relevant antenna selecting unit ($\mathbf{3}_1$, $\mathbf{3}_2$, . . . , or $\mathbf{3}_L$). The adding unit 8 combines the received signals that have been weighted by the weighting units 7 and supplies the resultant signal to the weight control circuit 9 and the combining unit 6. Each of the weighting unit 7 designates a weight to a relevantly received signal by varying the amplitude and phase thereof. Each of the weighting units 7 can be accomplished by either a digital signal processing circuit or an analog signal processing circuit. For example, each weighting unit 7 can be accomplished with a multiplying unit (mixer) that multiplies a received signal by a weight control signal or a variable attenuator/variable phase shifter that vary the amplitude/phase of a received signal.

The weight control circuit 9 defines weights that the K weighting units 7 designate to respectively received signals. In other words, the weight control circuit 9 determines weights that the weighting units 7 designate to respectively received signals corresponding to the output signal of the adding unit 8 and a predetermined reference signal in such a manner that a desired signal component of the relevant received signal becomes strong and interference signal components become weak. The desired signal depends on a circuit. In other words, in a circuit that processes a first incoming signal, the desired signal is a first incoming signal. In a circuit that processes a one-symbol-delayed signal, the desired signal is a one-symbol-delayed signal.

In other words, the weight control circuit 9 in the adaptive signal processing portion $\mathbf{4}_1$ defines weights that the weighting units 7 designate to the respectively received signals in such a manner that the first incoming signal component of the received signal obtained through the antenna selecting unit $\mathbf{3}_1$ becomes strong and the other signal components become weak. Likewise, the weight control circuit 9 in the adaptive signal processing portion $\mathbf{4}_2$ determines weights that the weighting units 7 designates to the respectively received signals in such a manner that the one-symbol-delayed signal component of the received signal obtained through the antenna selecting unit $\mathbf{3}_3$ becomes strong and the other components become weak. This operation applies to the weight control circuit 9 in the adaptive signal processing portion $\mathbf{4}_3$.

The weight determining method is categorized as LMS (Least Mean Square) algorithm, CMA (Constant Modulus Algorithm), and so forth.

The adaptive signal processing portions $\mathbf{4}_1$, $\mathbf{4}_2$, . . . , and $\mathbf{4}_L$ shown in FIG. 3 control weights corresponding to the combined received signal. Alternatively, the adaptive signal processing portions $\mathbf{4}_1$, $\mathbf{4}_2$, . . . , and $\mathbf{4}_L$ may control weights corresponding to K received signals obtained through the antenna selecting units.

Thus, the adaptive signal processing portions $\mathbf{4}_1$, $\mathbf{4}_2$, . . . , and $\mathbf{4}_L$ output signals of which the desired signal components of the first incoming signal, the one-symbol-delayed signal, and the two-symbol-delayed signal have become strong.

Output signals of the adaptive signal processing portions $\mathbf{4}_1$ and $\mathbf{4}_3$ that process delayed signals are sent to the combining unit 6 through delaying circuits $\mathbf{5}_2$ and $\mathbf{5}_3$, respectively. The delaying circuits $\mathbf{5}_2$ and $\mathbf{5}_3$ compensate times of the one-symbol-delayed signal and the two-symbol-delayed signal based on the incoming time of the first incoming signal. The combining unit 6 combines the first incoming signal directly received from the adaptive signal processing portion $\mathbf{4}_1$ and the delayed signals received through the delaying circuits $\mathbf{5}_2$ and $\mathbf{5}_3$. Examples of the combining method are coherent combining method and maximum-ratio combining method.

Next, an adaptive antenna according to a second embodiment of the present invention will be described.

Figure 4:
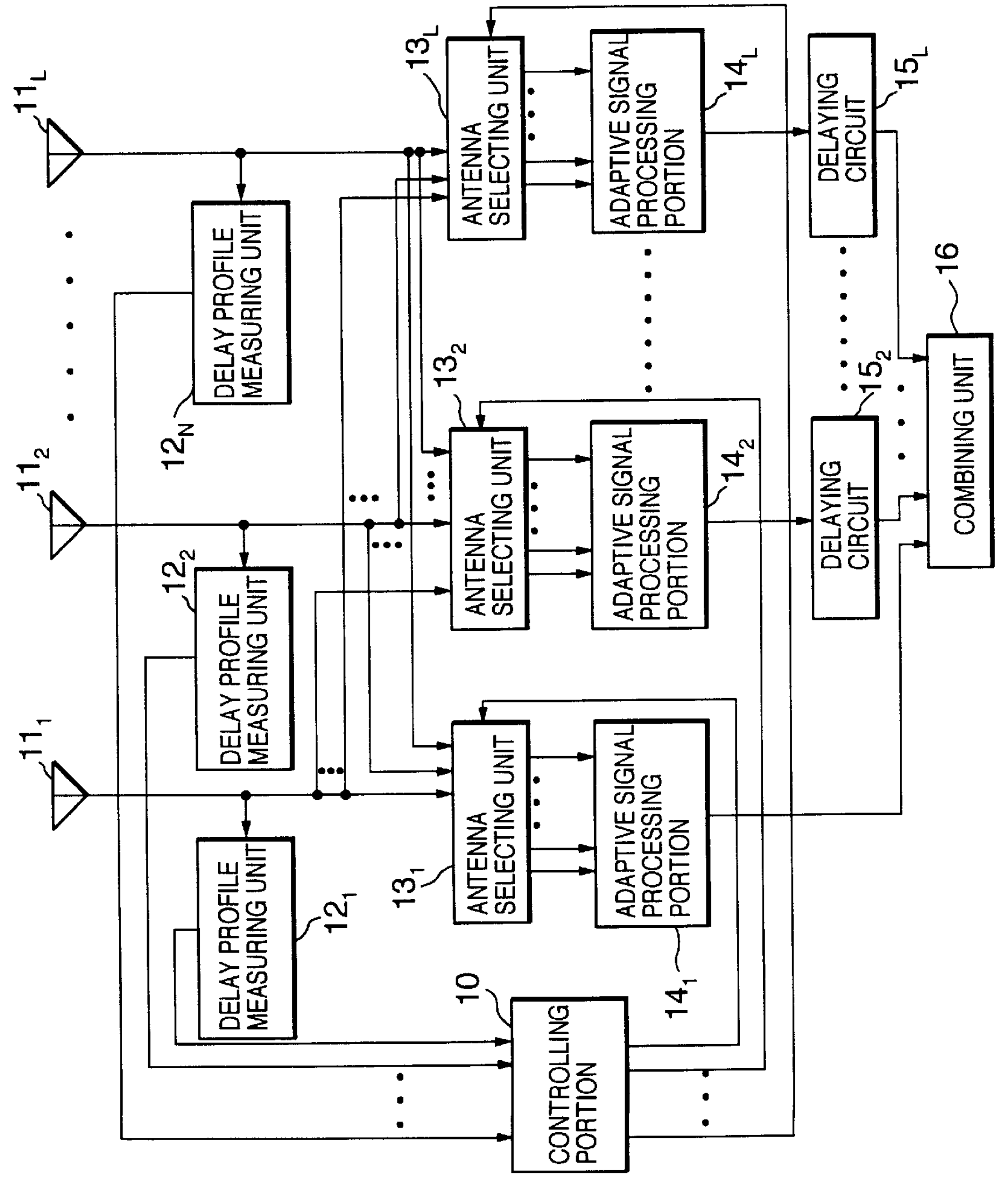
FIG. 4 is a schematic diagram showing the structure of an adaptive antenna according to a second embodiment of the present invention.

FIG. 4 is a schematic diagram showing the structure of the adaptive antenna according to the second embodiment.

Antenna elements $\mathbf{11}_1, \mathbf{11}_2, \ldots$, and $\mathbf{11}_N$ are connected to L (where N>L) antenna selecting unit $\mathbf{13}_1, \mathbf{13}_2, \ldots$, and $\mathbf{13}_L$. In addition, the antenna elements $\mathbf{11}_1, \mathbf{11}_2, \ldots$, and $\mathbf{11}_N$ are connected to delay profile measuring units $\mathbf{12}_1, \mathbf{12}_2, \ldots$, and $\mathbf{12}_N$. The delay profile measuring units $\mathbf{12}_1, \mathbf{12}_2, \ldots$, and $\mathbf{12}_N$ measure respective delay profiles of the antenna elements $\mathbf{11}_1, \mathbf{11}_2, \ldots$, and $\mathbf{11}_N$ and supplies the measured delay profiles to a controlling portion 10.

The controlling portion 10 designates antenna selecting conditions of the antenna selecting units $\mathbf{13}_1, \mathbf{13}_2, \ldots$, and $\mathbf{13}_L$ corresponding to the delay profiles of the antenna elements. In other words, the controlling portion 10 causes the antenna selecting unit $\mathbf{13}_1$ to select K antennas that receive the first incoming signal. In addition the controlling portion 10 causes the antenna selecting unit $\mathbf{13}_2$ to select K antennas that receive the one-symbol-delayed signal.

The received signals of K antenna elements selected by each of the antenna selecting units $\mathbf{13}_1, \mathbf{13}_2, \ldots$, and $\mathbf{13}_L$ are supplied to adaptive signal processing portions $\mathbf{14}_1, \mathbf{14}_2, \ldots$, and $\mathbf{14}_L$, respectively. Thus, as with the first embodiment shown in FIG. 1, signals of which the powers of desired signal components of the first incoming signal and delayed signals have become strong can be obtained.

Output signals of the two adaptive signal processing portions $\mathbf{14}_2$ and $\mathbf{14}_3$ are supplied to a combining unit 16 through delaying circuits $\mathbf{15}_2$ and $\mathbf{15}_3$, respectively. The combining unit 16 combines the first incoming signal received from the adaptive signal processing portion $\mathbf{14}_1$ and the delayed signals received from the delaying circuits $\mathbf{15}_2$ and $\mathbf{15}_3$, and outputs the resultant signal as one received signal.

Next, the effects of the adaptive antenna according to each of the first and second embodiments will be described.

The adaptive antenna according to the first and second embodiments combines a first incoming signal component and delayed signal components, thereby obtaining a received signal with a high signal-to-noise ratio.

The adaptive antenna according to each of the first and second embodiments selects antenna elements with larger power, intensity, or signal-to-noise ratio and designates weights to signals received from the selected antenna elements. Thus, the number of weighting units 7 can be reduced in comparison with that of the conventional adaptive antenna. Consequently, the adaptive signal process can be effectively performed. In addition, a received signal with a high signal-to-noise ratio can be obtained.

The adaptive antenna according to the present invention can be partly modified as follows.

An antenna selector selects antenna elements whose measured delay profiles exceed a predetermined reference value. In other words, the difference between the above-described embodiments and this modification is in that the number of antenna elements is not constant.

In this modification, since all effective signals are used, a resultant signal has a high signal-to-noise ratio.

In the adaptive antenna according to the first embodiment shown in FIG. 1, since the delay time (=0) of the output signal of the adaptive signal processing portion $\mathbf{4}_1$ is used as a reference, no delaying circuit is connected to the adaptive signal processing portion $\mathbf{4}_1$. In other words, delaying circuits may be connected to all adaptive signal processing portions.

The present invention is based on sector beams with different beam directions regarding to the directivity of each antenna elements. However, when received signals of a plurality of omni-directional elements are Fourier-transformed, orthogonal multi-beams are formed and thereby an adaptive signal process is performed for the resultant beams in the beam space.

The present invention can be applied to an adaptive antenna with circuits that Fourier-transform received signals of antenna elements. Examples of the Fourier transform method are analog method using lenses or reflectors and FFT (Fast Fourier Transform) method of which digital signals converted from analog signals are Fourier-transformed.

Received signals of the adaptive antenna according to the present invention can be analog signals or digital signals. When received signals are digital signals, output signals of antenna elements are converted into digital signals by A/D converters.

Next, an adaptive antenna according to a third embodiment of the present invention will be described. The adaptive antenna according to the third embodiment features in the selecting method of antenna elements.

Each antenna selecting unit in the adaptive antenna selects K antenna elements with larger power, intensity, or signal-to-noise ratio of a desired signal for each of delay times. In addition, each antenna selecting unit selects P (where $1 \leqq P$) antenna elements with larger power, intensity, or signal-to-noise ratio of undesired signal. Generally, an adaptive antenna tends to form null to the DOA of undesired signal whose level is large and whose correlation with a desired signal is small. Thus, when such antenna elements are selected, undesired signals can be remarkably suppressed.

Next, an adaptive antenna that has a means that estimates an interference signal will be described. This adaptive antenna selects K antenna elements with larger power, intensity, or signal-to-noise ratio of received signals as a desired signal for each of delay times. In addition, the adaptive antenna selects P (where $1 \leqq P$) antenna elements with larger power, intensity, or signal-to-noise ratio of interference signal signals. Generally, an adaptive antenna tends to designate null to the DOA of a non-desired signal whose level is large and whose correlation with a desired signal is small. Thus, when such antenna elements are selected, a signal of a non-desired signal can be remarkably suppressed.

Next, a method for estimating an interference signal will be described.

Figure 5A:
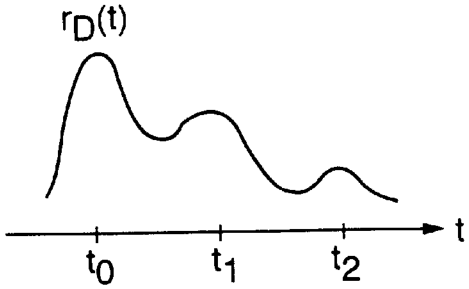
FIG. 5A, FIG. 5B, FIG. 5C, FIG. 5D, FIG. 5E, FIG. 5F, and FIG. 5G are graphs for explaining a method for estimating an interference signal of the adaptive antenna that has a means for estimating the interference signal according to the present invention.
Figure 5B:
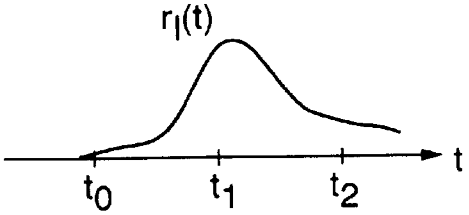
Figure 5C:
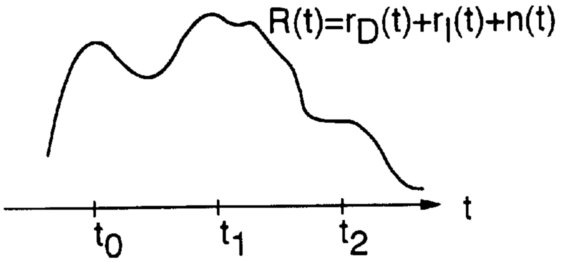

FIG. 5A shows a delay profile $r_D(t)$ of a desired signal and a delayed signal of a particular antenna element. FIG. 5B shows a delay profile $r_I(t)$ of an interference signal. FIG. 5C shows a delay profile of a received signal $R(t)=r_D(t)+r_I(t)+n(t)$ (where n(t) is a thermal noise component that is added when a signal is received.

Figure 5D:
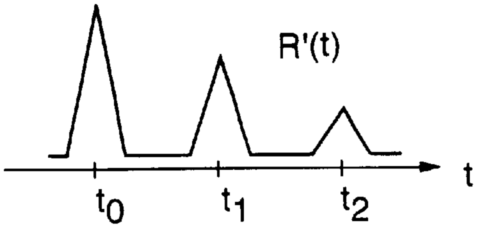

FIG. 5D shows a delay profile R'(t) estimated in the above-described correlating process. A replica $\hat{R}(t)$ (not shown) of a combined signal of a desired signal and a delayed signal can be obtained corresponding to the delay profile R'(t).

Figure 5E:
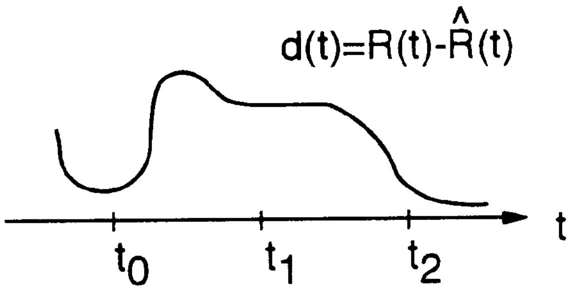

As shown in FIG. 5E, a difference signal d(t) of the received signal R(t) and the replica $\hat{R}(t)$ is composed of an interference signal component, a delayed signal component, and a thermal noise component (that have not been time-decomposed). Thus, with the difference signal d(t) of each antenna element, the intensity of the interference signal can be approximately obtained.

Figure 5F:
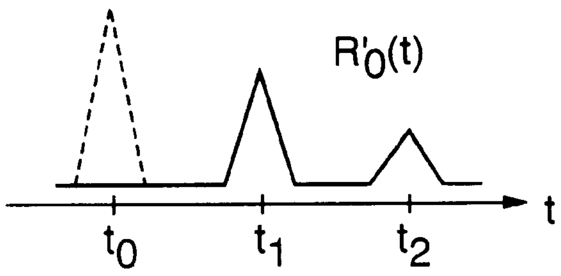

In addition, FIG. 5F shows a delay profile $R'_0(t)$ estimated, which is composed of all delayed signals except for a desired signal at delay time ($t_0$). When the replica $\hat{R}_0(t)$ of a combined signal which is composed corresponding to the estimated delay profile $R'_0(t)$ is provided, as shown in FIG. 5F, the difference signal $d_0(t)$ of the received signal R(t) and the replica $\hat{R}_0(t)$ is composed of a desired signal component at $t_0$, an interference signal component, a delayed signal component (that cannot be fully time-decomposed), and a thermal noise component. When the adaptive array process is performed with the difference signal $d_0(t)$ instead of the received signal, the interference signal can be sufficiently suppressed.

Figure 5G:
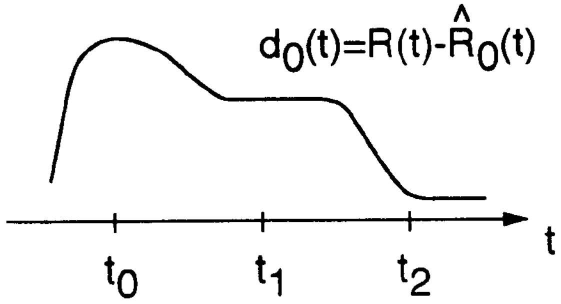

Antenna elements may receive delayed signal in the same direction as a desired signal or in a direction close thereto. In this case, when the adaptive process is performed with $d_0(t)$ shown in FIG. 5G, delayed signals and interference signals can be remarkably suppressed.

The adaptive signal processing portion is often structured in such a manner that it successively performs a feed-back process so as to converge the weighting amount of each of the antenna elements. Alternatively, a SMI (Sample Matrix Inverse) method that does not use the feed-back process can be applied. This method need very large amount of processing (e.g. calculation of inverse matrix), but a stable output signal can be obtained without a dispersion of weighting amounts because there is no feed-back line.

In addition, in the case that the distance between adjacent antenna elements is large, this adaptive can perform as a diversity that can suppress undesired signals.

In addition, when an error correction encoding/decoding system is applied to the adaptive antenna according to the present invention, undesired signal that the adaptive array receives in the same direction as a desired signal or in a direction close thereto can be effectively suppressed. Alternatively, the same effect can be obtained with a coding modulation system.

In the TDD (Time Division Duplex) system, since the same frequency is used for a transmission channel and a reception channel, when the time interval between a signal transmission and a signal reception is very short, a transmission signal and a reception signal pass through the same propagation path. Thus, with a delay profile estimated for a signal reception, when one or more transmission antenna elements are selected, an optimum receiving environment can be obtained on the receiver side. When a propagation path condition does not almost vary after a signal is received until next signal is transmitted, the antenna elements and weights that have been selected and designated for a signal reception can be used for next signal transmission. Thus, calculations of weights for a signal transmission can be omitted.

In addition, the adaptive antenna according to the present invention can be applied to a receiver of a CDMA (Code Division Multiple Access) system. In this case, the path diversity of the CDMA type RAKE receiver and the delay profile estimating technology with a high time-resolution can be directly used. Thus, the channel capacity of the CDMA system in multi-interference environment can be increased.

In addition, with SDMA (Space Division Multiple Access) system or PDMA (Path Division Multiple Access) that assigns difference channels to signals that are received from different directions in the same cell, the adaptive antenna according to the present invention can effectively control the directivity. In a cell of TDMA (Time Division Multiple Access) system such as cellular system, since signals on the same spatial channel can be separately received, a large allowable interference amount of the system can be designated. Thus, since the repetitive number of cells with the same channel can be decreased, the system capacity can be increased.

Next, with reference to FIG. 6, an adaptive antenna according to a fourth embodiment of the present invention will be described.

Next, an adaptive antenna according to a fourth embodiment of the present invention will be described.

Figure 6:
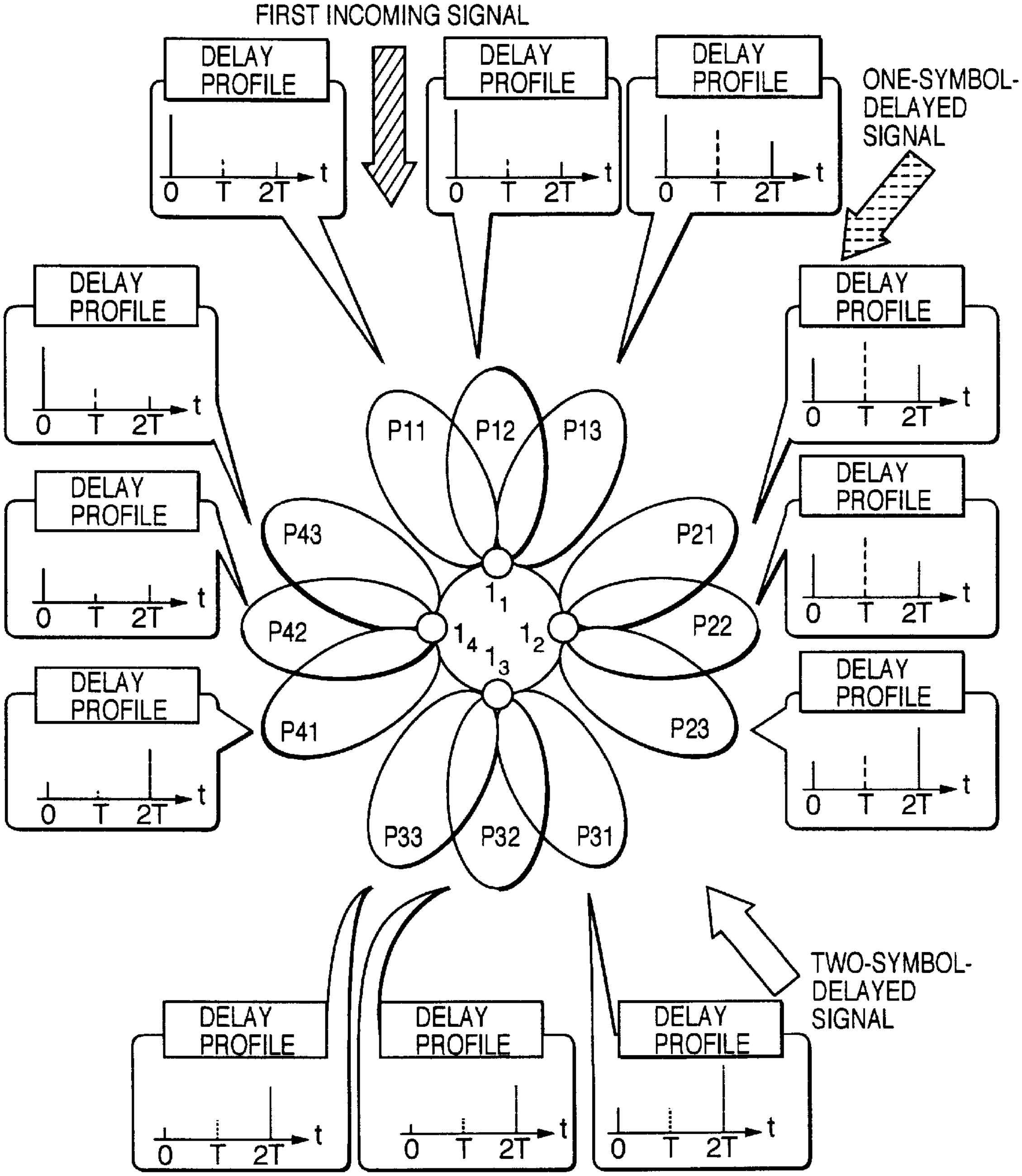
FIG. 6 is a schematic diagram for explaining an adaptive antenna according to a fourth embodiment of the present invention.

As shown in FIG. 6, each of elements $\mathbf{1}_1$ to $\mathbf{1}_4$ of the adaptive antenna according to the fourth embodiment can generate three beams $P_{11}$, $P_{12}$, . . . , $P_{43}$with different directivity. It is assumed that a first incoming signal, a one-symbol-delayed signal, and a two-symbol-delayed signal are received as shown in FIG. 6. In addition, it is assumed that delay profile estimating units (not shown) of the antenna elements estimate powers of received signals.

In the adaptive antenna according to the fourth embodiment, K (≦4) antenna elements with larger power, intensity, or signal-to-noise ratio of a received signal of each of the first incoming signal, one-symbol-delayed signal, and two-symbol-delayed signal are selected from antenna elements that generate one of $P_{i1}$, $P_{i2}$, and $P_{i3}$ (where i=1, 2, 3, and 4) beams. Thereafter, the adaptive signal process that will be described later is performed with the selected antenna elements.

In the adaptive antenna according to the present invention, the current beams of the individual antenna elements are switched until the next reception time in the following manner.

For example, the beams of the individual antenna elements are selected in the ascending order (namely, beams $P_{11}$, $P_{21}$, $P_{31}$, and $P_{41}$) are selected. After signals are received, delay profiles of the individual antenna elements are estimated. At t=0, it is clear that since the powers of the first incoming signal of the beams $P_{11}$ and $P_{21}$ are remarkably large, the first incoming signal is received from the forward direction of the antenna element $\mathbf{1}_1$ or from the direction between the antenna elements $\mathbf{1}_1$ and $\mathbf{1}_2$. Thus, at the next reception time, the current beams of the individual antenna elements are switched to beams close to the predicted directions from which the first incoming signal is received. In other words, at the next reception time, the beams $P_{11}$, $P_{21}$, $P_{31}$, and $P_{41}$ are switched to the beams $P_{12}$, $P_{21}$, $P_{31}$, and $P_{42}$. In this state, the signals are received and delay profiles are estimated. After the DOA of the first incoming signal has been estimated, when necessary, the beams of the individual antenna elements are further switched. When the DOA of the first incoming signal does not vary time by time, the antenna elements finally generate beams $P_{12}$, $P_{21}$, $P_{31}$, and $P_{43}$.

By sequentially performing the above-described operation, even if the DOA of the first incoming signal varies time by time, the current beams can be switched to those of which the first incoming signal is strongly received. With the strong beams, the adaptive signal process can be performed.

Thus, the individual antenna elements generate beams with different directivity. The receiving states of the individual signals are estimated. In addition, a received signal is selected for the adaptive signal process. Consequently, the distortion of the received signal due to interference can be further effectively suppressed.

In the above-described embodiment, in antenna elements with larger powers of the first incoming signal, at the next reception time, beams are successively switched. Alternatively, delay profiles at the last reception time are compared. The DOA of a signal with the largest power of the first incoming signal, one-symbol-delay signal, and two-symbol-delay signal is estimated. Corresponding to the estimated DOA, beams of the individual antenna elements may be switched.

Next, the structure of an antenna that generates a plurality of beams with different directivity will be described.

Figure 7:
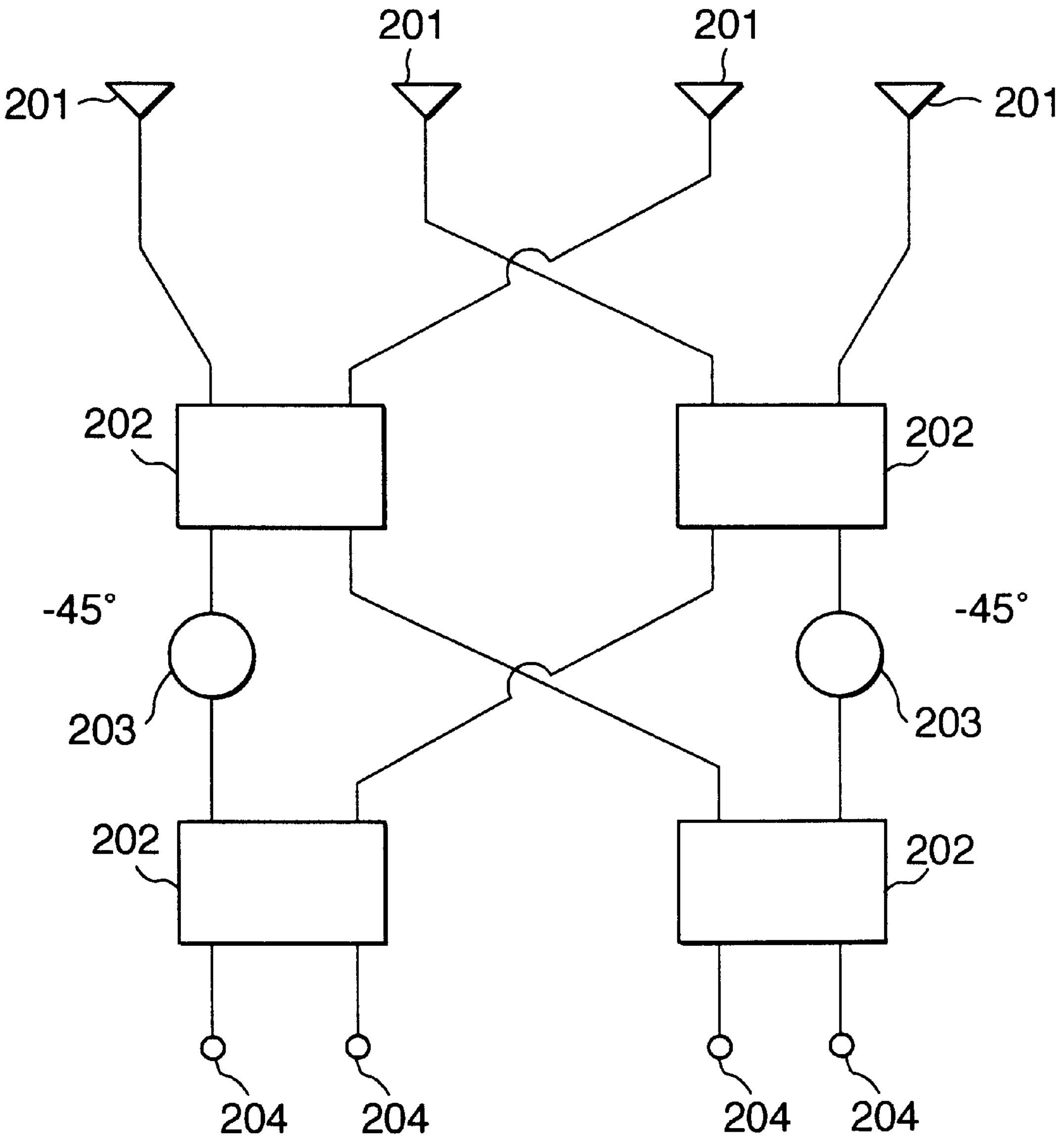
FIG. 7 is a schematic diagram showing the structure of an antenna that form a plurality of beams with different directivity.

FIG. 7 shows the structure of a switching scanning type antenna with a butler beamforming matrix. This antenna comprises four antenna elements 201, four hybrid circuits 202, and two 45° phase shifters. By switching signals applied to feeder terminals 204 of two hybrid circuits 202, the radiating direction of a beam is changed. This method is available when the number of antenna elements is a power of 2.

Figure 8:
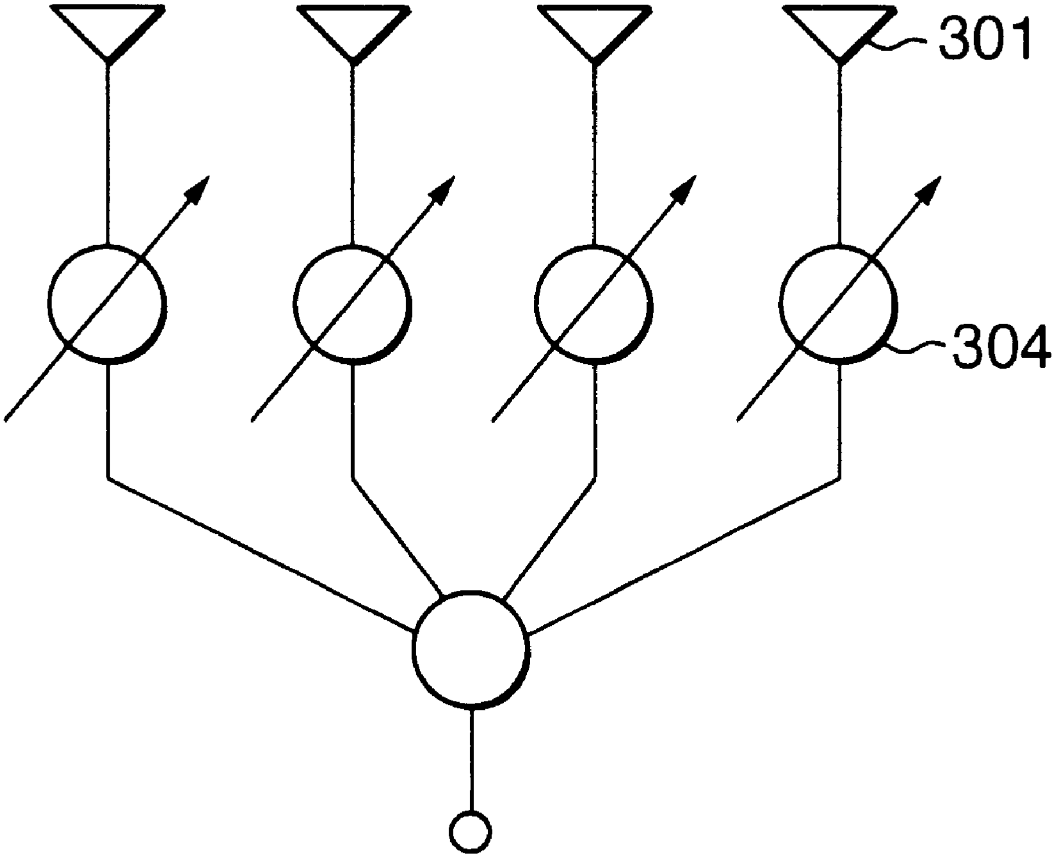
FIG. 8 is a schematic diagram showing the structure of another antenna that form a plurality of beams with different directivity.
Figure 9:
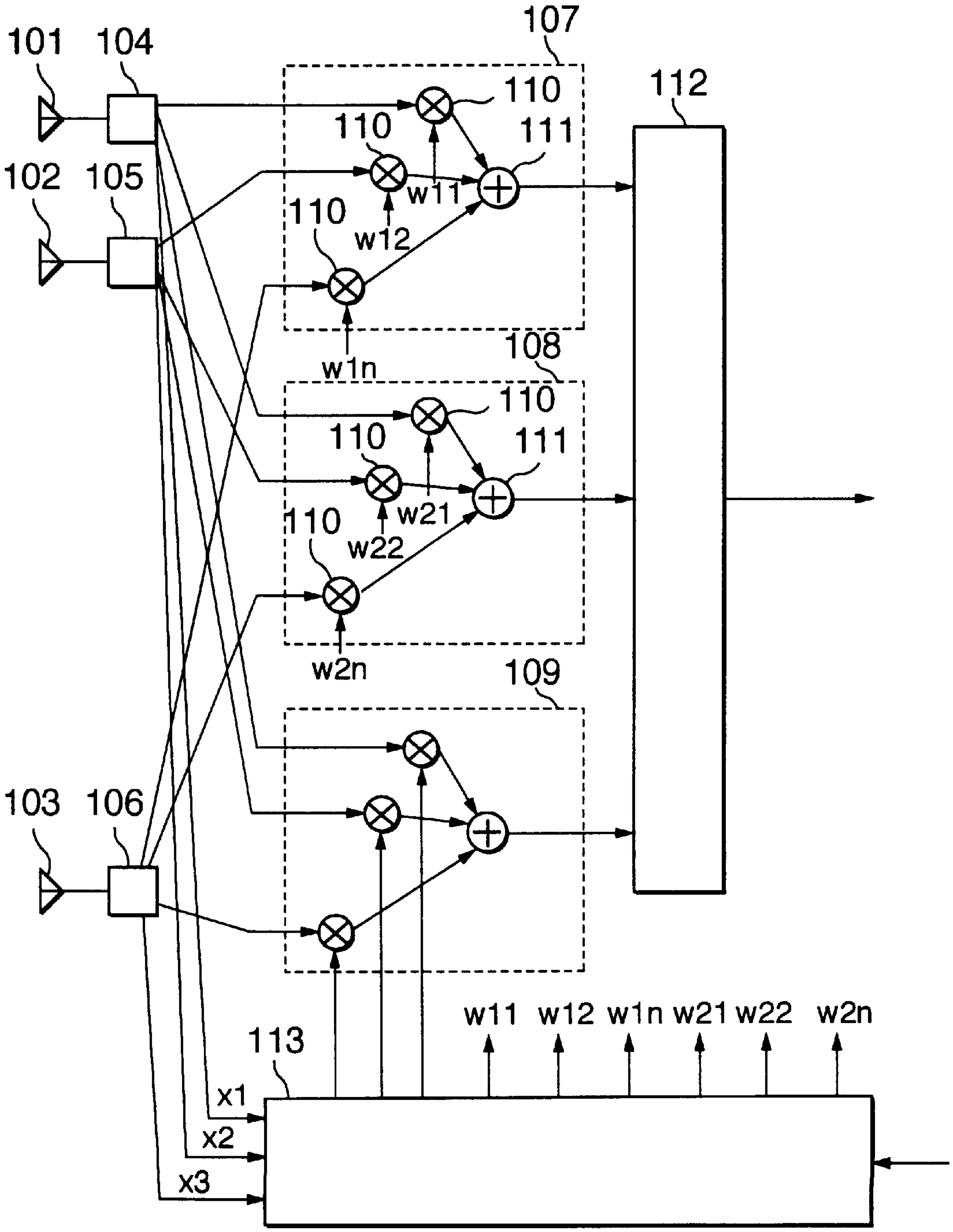
FIG. 9 PRIOR ART
FIG. 9 is a schematic diagram showing the structure of a conventional adaptive antenna.

FIG. 8 shows the structure of a phase scanning type antenna. In this antenna, the excitation phase of each antenna element 301 is controlled by a phase shifter 304. Thus, a plurality of beams with different directivity are generated. In this antenna, a scanning operation can be performed with high flexibility under the control of the phase shifting unit 304.

Alternatively, a reflector antenna or an antenna that mechanically changes a beam may be used.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An adaptive antenna, comprising:

a plurality of antenna elements with different directivity;

estimating means for estimating states of received signals of said antenna elements for each of delay times that have been designated;

selecting means for selecting a part of said antenna elements for each of the delay times corresponding to the estimated result;

weighting means for determining the received signals of the part of said antenna elements selected by said selecting means by relevant weights;

first combining means for multiplying the received signals to which relevant weights have been determined for each of the delay time and summing the weighted signals;

compensating means for compensating the time lag, or time delay of each of the received signals for each of the delay times; and second combining means for combining the compensated signals for the delay times.

2. The adaptive antenna as set forth in claim 1, wherein said estimating means estimates the power, intensity, or signal-to-noise ratio of the received desired signals of said antenna elements for each of the delay times.

3. The adaptive antenna as set forth in claim 2, wherein said selecting means selects some antenna elements with larger power, intensity, or signal-to-noise ratio of the received desired signal for each of the delay times corresponding to the estimated result.

4. The adaptive antenna as set forth in claim 2, wherein said selecting means selects at least one first antenna element and at least one second antenna element corresponding to the estimated result, the first antenna elements having larger power, intensity, or signal-to-noise ratio of the received desired signals for a each of the delay time, the second antenna elements having larger power, intensity, or signal-to-noise ratio of the received undesired delayed signals for each of the delay times.

5. The adaptive antenna as set forth in claim 2, wherein said selecting means selects at least one first antenna element and at least one second antenna element corresponding to the estimated result, the first antenna elements having larger power, intensity, or signal-to-noise ratio of the received desired signals for a each of the delay time, the second antenna elements having larger power, intensity, or signal-to-noise ratio of the received interference signals for each of the delay times.

6. The adaptive antenna as set forth in claim 5, wherein said second selecting means has:

means for generating replicas of signals that said antenna elements receive for each of the delay times corresponding to the estimated result and estimating interference signal signals that said antenna elements receive corresponding to the generated replicas and the received signals of said antenna elements; and means for selecting the second antenna element corresponding to the estimated result of the interference signal signals.

7. An adaptive antenna, comprising:

a plurality of antenna elements for generating respective beams with different directivity;

estimating means for estimating states of received signals of beams of said antenna elements for each of delay times that have been designated;

selecting means for selecting one beam of a part of said antenna elements corresponding to the estimated result;

weighting means for determining the received signals of the beams of the part of said antenna elements selected by said selecting means by relevant weights;

first combining means for multiplying the received signals to which relevant weights have been determined for each of the delay time and summing the weighted signals;

compensating means for compensating the time lag, or time delay of each of the received signals for each of the delay times; and second combining means for combining the compensated signals for the delay times.

8. The adaptive antenna as set forth in claim 7, wherein said estimating means estimates the power, intensity, or signal-to-noise ratio of the received signals of beams of said antenna elements for each of the delay times.

* * * * *

UNITED STATES PATENT AND TRADEMARK OFFICE

CERTIFICATE OF CORRECTION

PATENT NO. : 6,061,553

DATED : May 9, 2000

INVENTOR(S): Hidehiro MATSUOKA et al.

It is certified that an error appears in the above-identified patent and that said Letters Patent is hereby corrected as shown below:

Column 4, Line 64, Delete "$4_1$" and insert --$4_2$--.

Column 8, Line 1, change "difference" to --different--.

Signed and Sealed this

Twenty-second Day of May, 2001

*Attest:*

Nicholas P. Godici

NICHOLAS P. GODICI

*Attesting Officer*

*Acting Director of the United States Patent and Trademark Office*